(12) United States Patent
Feick et al.

(10) Patent No.: US 10,730,418 B1
(45) Date of Patent: Aug. 4, 2020

(54) SEAT COVER

(71) Applicant: American Honda Motor Co., Inc., Torrance, CA (US)

(72) Inventors: Lisa J. Feick, Marysville, OH (US); Stanley Robert Egbert, II, Anna, OH (US)

(73) Assignee: American Honda Motor Co., Inc., Torrance, CA (US)

( * ) Notice: Subject to any disclaimer, the term of this patent is extended or adjusted under 35 U.S.C. 154(b) by 0 days.

(21) Appl. No.: 16/267,708

(22) Filed: Feb. 5, 2019

(51) Int. Cl.
    *B60N 2/60*      (2006.01)
    *B60R 7/00*      (2006.01)
    *B60N 2/56*      (2006.01)

(52) U.S. Cl.
    CPC .............. *B60N 2/60* (2013.01); *B60N 2/5621* (2013.01); *B60R 7/005* (2013.01)

(58) Field of Classification Search
    CPC ...... B60N 2/60; B60N 2/5624; B60N 2/5621; B60R 7/005
    See application file for complete search history.

(56) References Cited

U.S. PATENT DOCUMENTS

| | | | |
|---|---|---|---|
| 5,806,925 A | 9/1998 | Hanley | |
| 6,648,410 B2 | 11/2003 | Sparks | |
| 7,258,399 B2 | 8/2007 | Fischman | |
| 2016/0023582 A1 | 1/2016 | Brian | |
| 2016/0107552 A1 | 4/2016 | Wakeman | |
| 2017/0224118 A1 | 8/2017 | Fernandez | |
| 2018/0368586 A1* | 12/2018 | Uemura | A47C 31/11 |
| 2018/0370403 A1* | 12/2018 | Townley | B23K 13/00 |

FOREIGN PATENT DOCUMENTS

| | | |
|---|---|---|
| CN | 201261412 Y | 6/2009 |
| CN | 204845632 U | 12/2015 |
| CN | 205768839 U | 12/2016 |
| CN | 106696794 A | 5/2017 |
| CN | 107097701 A | 8/2017 |
| CN | 207140876 U | 3/2018 |
| DE | 102004001912 B4 | 8/2005 |
| DE | 102007054541 A1 | 5/2009 |
| JP | 2016112972 A | 6/2016 |
| KR | 20110053869 A | 5/2011 |

\* cited by examiner

*Primary Examiner* — Anthony D Barfield
(74) *Attorney, Agent, or Firm* — Honda Patents & Technologies North America, LLC; Clifford B Vaterlaus

(57) ABSTRACT

A cover for removable attachment to a vehicle seat includes a first portion formed of a first material. The first portion is configured to be placed on an area of the seat corresponding to a ventilation area of the seat. The first material comprises a mesh fabric defining openings for allowing air to pass through the first portion. The first material also includes a silicone coating to impede the flow of liquid through the first portion. A second portion of the cover is formed of a second material that is different from the first material. The second portion is joined to an edge of the first portion and is configured for covering a lateral portion of the seat. The cover also includes an attachment mechanism for removably attaching the cover to the seat.

20 Claims, 5 Drawing Sheets

SEAT COVER

BACKGROUND

The disclosed subject matter relates to vehicle accessories. More particularly, the disclosed subject matter relates to removable seat covers for vehicle seats.

Vehicle seats are commonly subjected to wear, fading, stains, sweat, dirt, water, or the like, that diminish the aesthetic appearance of the seats. Removable seat covers are commercially available to provide protection to vehicle seats. The seat covers may be removed to be cleaned or replaced such that the seats themselves may be maintained in a better condition.

Some vehicle seats are known to have ventilation systems to allow the vehicle occupants to be cooled. Such ventilated seats may have perforations that allow air to be circulated through the seats to the occupants. The known seat covers are not compatible with such ventilated seats since the covers prevent air from circulating to the occupants.

It would be desirable to provide a seat cover that protects vehicle seats while still allowing use with ventilated seats. It would also be desirable to provide such a seat cover that is removable and that can be produced economically.

SUMMARY

In accordance with one embodiment of the present disclosure, a seat cover for removable attachment to a seat is disclosed. The seat cover includes a first portion formed of a first material, the first portion configured to be placed on an area of the seat corresponding to a ventilation area of the seat. The seat cover also includes a second portion formed of a second material that is different from the first material. The second portion is joined to an edge of the first portion and is configured for covering a lateral portion of the seat. The seat cover includes an attachment mechanism for removably attaching the first portion and the second portion to the seat. The first material includes a mesh fabric defining openings for allowing air to pass through the first material. The first material further includes a silicone coating to create liquid surface tension and impede the flow of liquid through the first material.

In accordance with another embodiment of the present disclosure, a seat cover includes a first portion formed of a first material comprising a mesh fabric defining openings for allowing air to pass through the first material. The first portion is configured to be placed on an area of the seat corresponding to a ventilation area of the seat. A second portion is formed of a second material that is different from the first material. The second portion is joined to a peripheral edge of the first portion such that the first portion is positioned in a central area of the cover, and the second portion is positioned on opposing lateral sides of the first portion. The seat cover also includes an attachment mechanism for removably attaching the first portion and the second portion to the seat.

A further embodiment of a seat cover includes a first portion formed of a first material comprising a mesh fabric defining openings for allowing air to pass through the first material. The first material further comprises a silicone coating to create liquid surface tension and impede the flow of liquid through the first material. The first portion is configured to be placed on an area of the seat corresponding to a ventilation area of the seat. The seat cover also includes a second portion formed of a second material that is different from the first material. The second portion is joined to a peripheral edge of the first portion such that the first portion is positioned in a central area of the cover, and the second portion is positioned on opposing lateral sides of the first portion.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
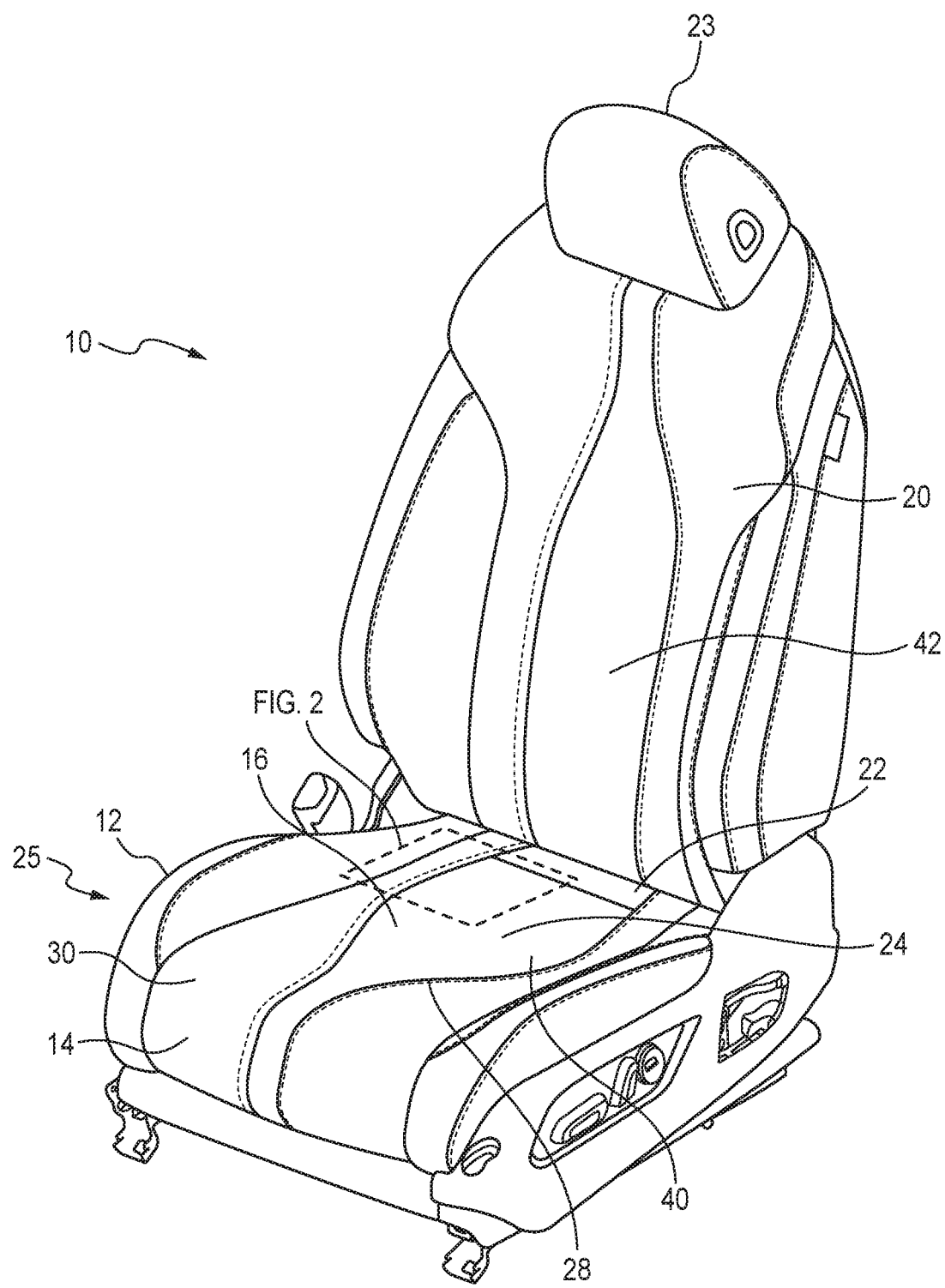
FIG. 1 is a front perspective view depicting a vehicle seat useful in accordance with the principles of the present disclosure.

FIG. 1 illustrates a perspective view of one embodiment of a vehicle seat, indicated generally at 10, useful in accordance with embodiments of the present disclosure. It will be understood that any of a variety of vehicle seats may be used in accordance with the principles of the present disclosure, including bucket seats or bench seats. It will also be understood that alternative embodiments of the present disclosure may be used with seats that are not associated with a vehicle. The vehicle seat 10 may include a seat bottom 12 having a front side 14 and a top side 16. The seat 10 may also include a seat back 20 extending upwardly from a rear portion 22 of the seat bottom 12. The seat back 20 may be adjustable to fold with respect to the seat bottom 12 in a manner known to those skilled in the art. The seat 10 may also include a headrest 23 vertically adjustable on an upper side of the seat back 20. In addition, the vehicle seat 10 may be adjustable and/or movable in a forward, rearward, upward and downward direction in a conventional manner. Moreover, the seat 10 may include a heating, cooling and/or ventilation system (not shown) provided in an interior of the seat 10. The seat heating, cooling and/or ventilation system may be configured to push or draw air through a surface of the seat 10 in a manner known in the art.

Figure 2:
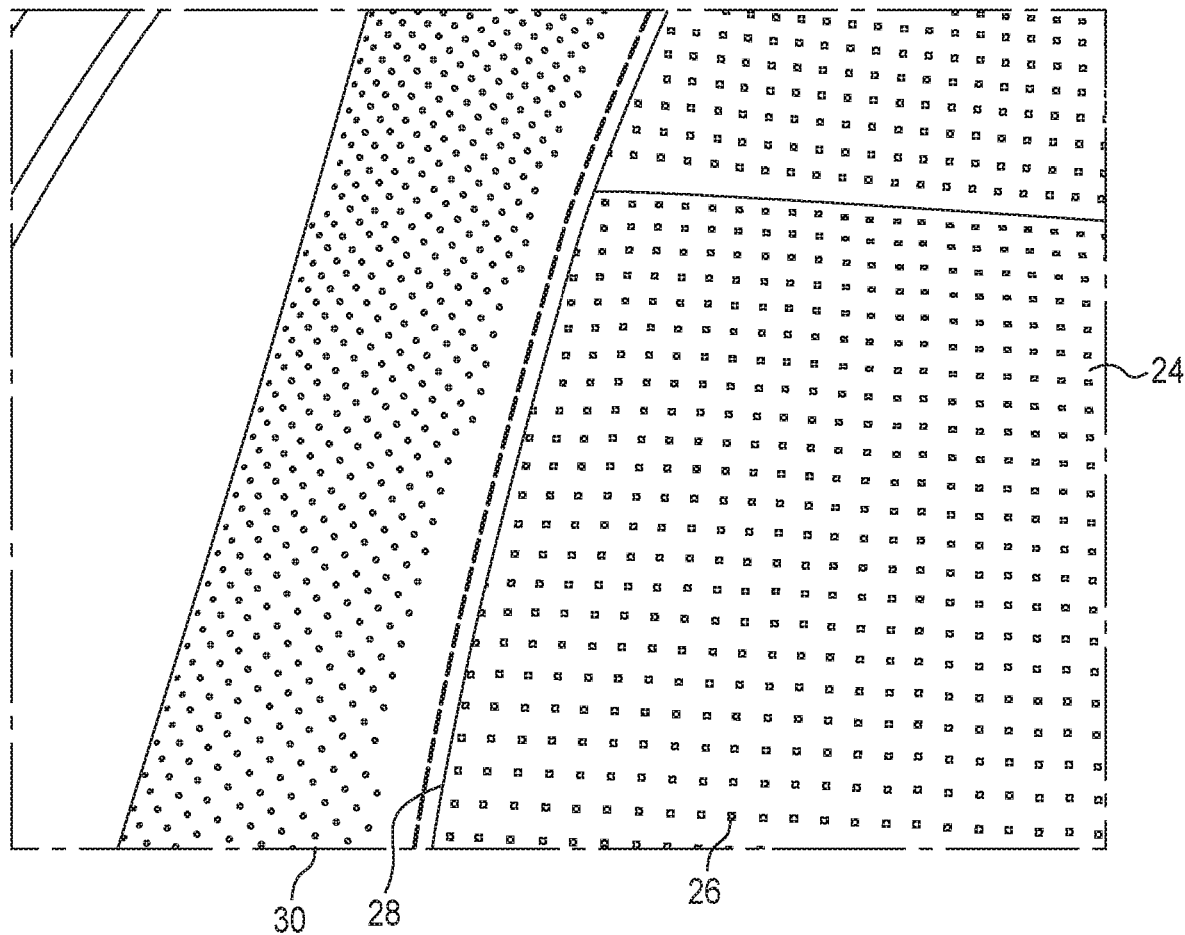
FIG. 2 is an enlarged view of a portion of the seat of FIG. 1.

The seat bottom 12 may include a first covering 24 having perforations 26 as shown most clearly in FIG. 2, which depicts an enlarged view of a portion of an exterior surface of the seat 10. The perforations 26 may be configured to allow air from the seat ventilation system to circulate to an occupant of the seat 10 to cool the occupant. The perforations 26 may have any suitable shape, such as rectangular, square, round or the like. It will be understood that alternative embodiments may have perforations of different sizes and configurations within the scope of the present disclosure.

The first covering 24 may envelope the entire seat 10, or the first covering 24 may be joined at a seam 28 to one or more second coverings 30. The first covering 24 and the second coverings 30 may be joined together at seams 28 by stitching, adhesives or any other suitable method known to those skilled in the art. It will be understood that the first covering 24, the second coverings 30 may be joined together to collectively form a seat covering 25 forming a surface of the seat bottom 12 and/or the seat back 20. In one embodiment, the seat covering 25 may be formed of a sheet material, such as leather. However, it will be understood that other suitable materials such as suede, alcantara, vinyl, cloth or the like, may be used to form the seat covering 25 within the scope of the present disclosure.

It will be understood that the perforations 26 may be positioned on the seat 10 so as to provide desired ventilation characteristics at a ventilation area 40 of the seat 10. Accordingly, the ventilation area 40 of the seat 10 requiring additional ventilation may utilize a perforation configuration that allows for greater air flow, whereas portions of the seat 10 that require less ventilation may utilize a perforation configuration that provides a lessor or no air flow. Accordingly, it will be understood that in different embodiments of the seat 10, different perforation characteristics and configurations may be used at the ventilation area 40. It will also be understood that some portions of the seat covering 25 may be provided with no perforations.

The seat back 20 may include the first covering 24 extending in a central portion 42 of the seat back 20. The configuration of the first covering 24 in the seat 10 may therefore be arranged to provide beneficial ventilation effects to the core of a person seated in the seat 10, whereas areas toward the lateral sides of the seat 10 may have reduced ventilation effects where they are not as beneficial.

Figure 3:
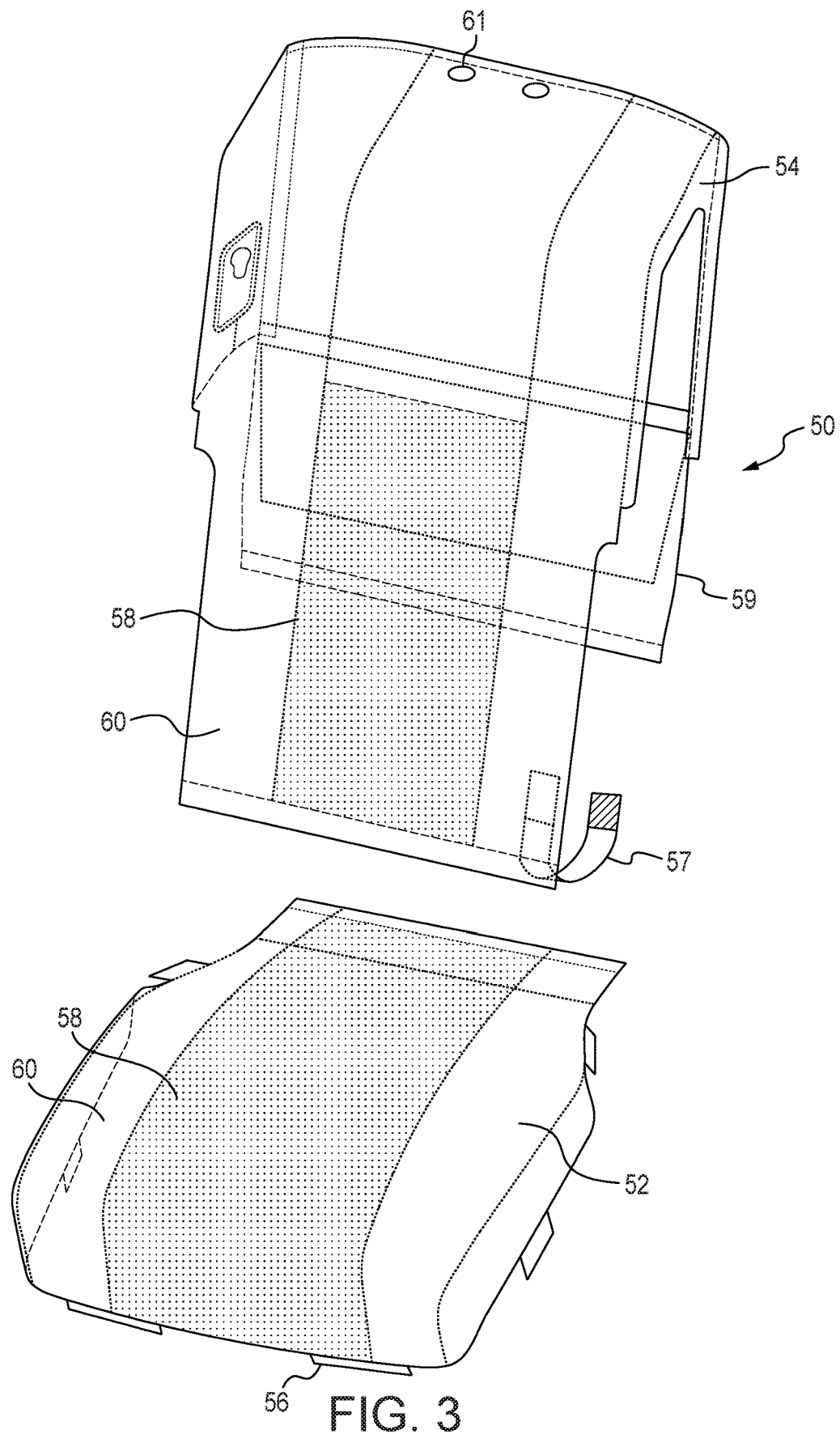
FIG. 3 is a front perspective view of a seat cover in accordance with the principles of the present disclosure.

Referring now to FIG. 3, a perspective view is shown of one embodiment of a seat cover, indicated generally at 50, in accordance with the principles of the present disclosure. The seat cover 50 may include a seat bottom cover 52 and a seat back cover 54. In one embodiment, the seat bottom cover 52 may be separate from the seat back cover 54. Alternatively, the seat bottom cover 52 and the seat back cover 54 may be attached to form a single piece. Some embodiments of the seat cover 50 may allow the sides of the seat 10, such as the bolsters, to remain uncovered so as to avoid interference with airbags that are sometimes positioned in the seat 10.

The seat cover 50 may be configured to be removably attachable to the vehicle seat 10 to protect the outer surface of the seat covering 25. Accordingly, the seat cover 50 may include an attachment mechanism 56 for removably attaching the seat cover 50 to the vehicle seat 10. The attachment mechanism 56 may include tabs, straps, hook and loop fasteners, buckles, clasps, hooks, elastic members, or the like, or any other suitable mechanism known to those skilled in the art for allowing the seat cover 50 to be removable attached to the vehicle seat 10. One embodiment of the attachment mechanism 56 may include tabs that have adequate rigidity to be inserted between the upholstery and the frame of the seat 10 to hold the seat cover 50 in place. In addition or alternatively, the seat cover 50 may include one or more straps 57 having clasps, fasteners, or the like to attach the seat cover 50 to the seat 10.

The seat cover 50 may also include a pocket 59 configured to fit within a seat pocket typically formed on the back of the vehicle seat 10. By positioning the pocket 59 of the seat cover 50 within the pocket in the vehicle seat 10, the pocket 59 may assist in holding the seat cover 50 in place while maintaining a useful location for storing items.

One embodiment of the seat cover 50 may be fitted such that the seat cover 50 is sized and shaped to receive the vehicle seat 10 to hold the seat cover 50 in place with respect to the seat 10. Also, features of the seat 10, such as the headrest 23 may be used to hold the seat cover 50 in place. For example, the seat cover 50 may include headrest openings 61 for receiving posts that support the headrest 23. Such features may also be referred to as attachment mechanisms 56 for removably attaching the seat cover 50 to the vehicle seat 10 within the scope of the present disclosure.

Figure 4:
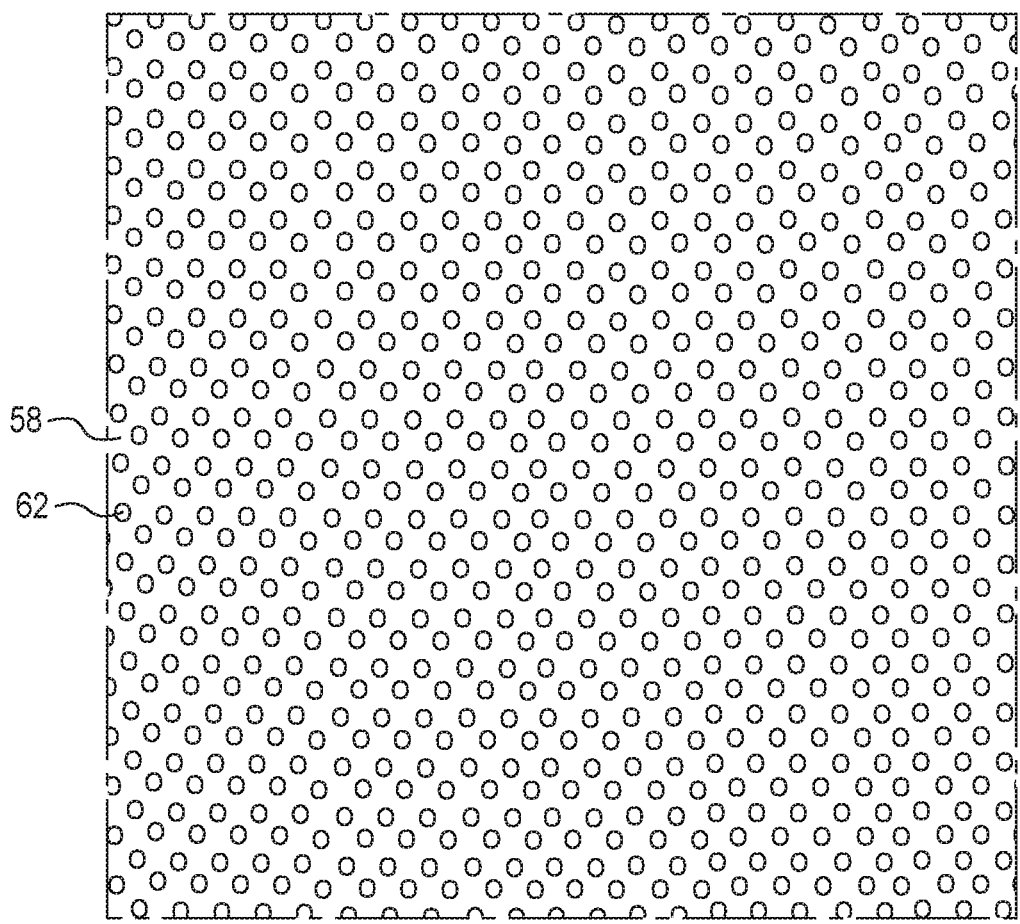
FIG. 4 is an enlarged view of a portion of the seat cover of FIG. 3.
Figure 5:
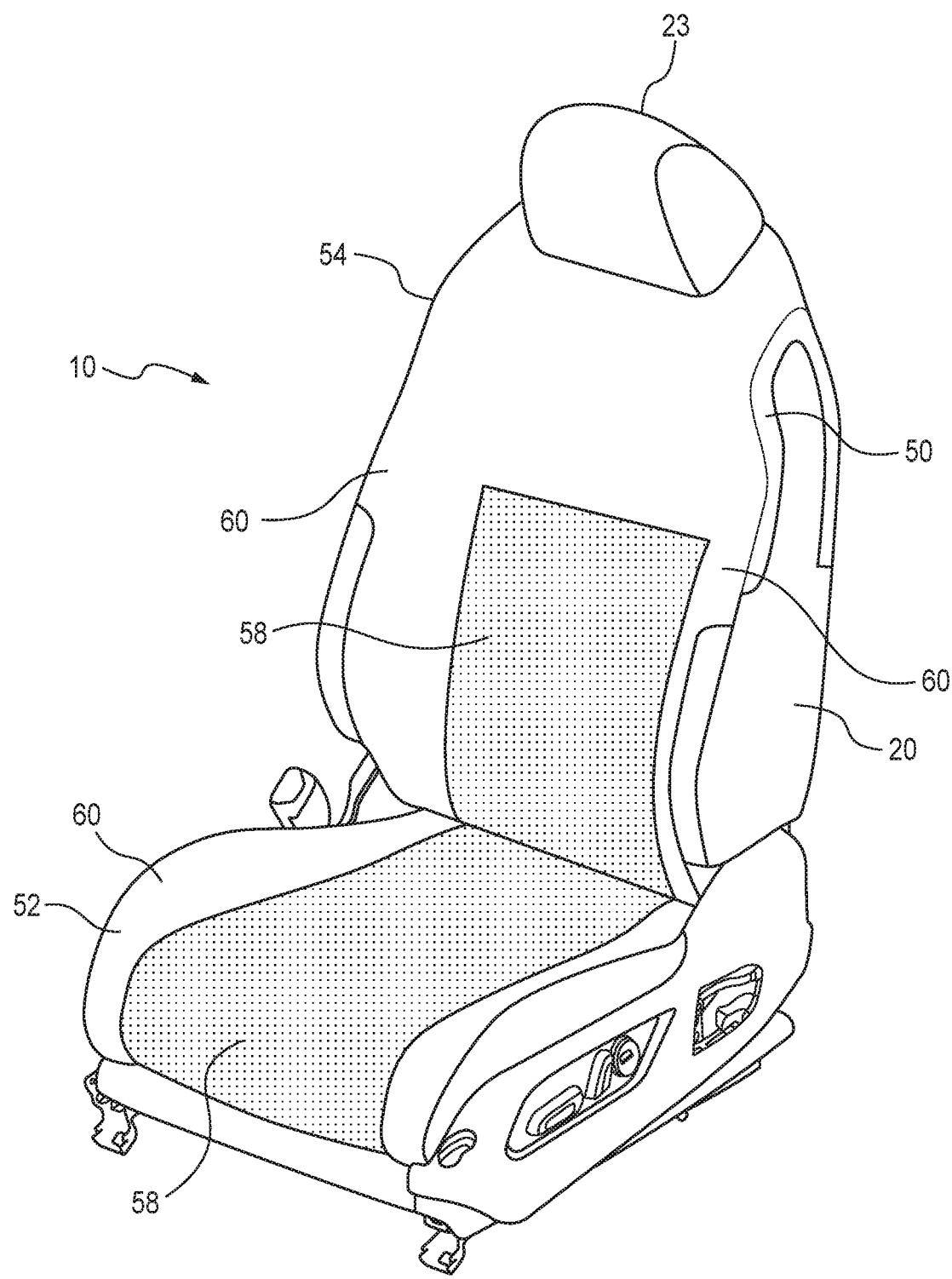
FIG. 5 is a front perspective view of a seat cover installed on a vehicle seat.

The seat cover 50 may include a first portion 58 formed of a first material, and a second portion 60 formed of a second material that is different from the first material. The first material may comprise a mesh fabric defining openings 62, as best shown in FIG. 4, for allowing air to pass through the first material. The first portion 58 may be configured to be placed on an area of the seat 10 corresponding to the ventilation area 40 of the seat 10. FIG. 5 shows a front perspective view of the seat cover 50 installed on a vehicle seat 10 so that the air circulated by the ventilation system in the seat 10 is able to pass through the openings 62 in the first portion 58 to the occupant of the seat 10.

In one embodiment, the first portion 58 is formed of woven polyester strands. The woven polyester strands may be coated with silicone such that when the first portion 58 is exposed to liquid, the silicone coating creates a liquid surface tension that impedes the flow of the liquid through the first material. The first portion 58 is therefore able to allow ventilation and also impede the flow of liquids from contacting the seat 10 to protect the seat 10.

In one embodiment of the first material, an exterior of the polyester strands is coated with silicone such that silicone covers the strands throughout a thickness of the first material. The polyester strands may be dipped in the silicone to cover the strands. Thus, in this embodiment, the silicone does not merely form a layer over the first material, and a composition of the first material is uniform, polyester strands coated with silicone, throughout a thickness of the first portion 58. It will be understood that other methods of applying the silicone to the first material may be used within the scope of the present disclosure. Moreover, other suitable materials may be applied to the first material to achieve a resistance to the flow of liquid through the material.

In one embodiment, the first material has a thickness of between approximately 2.0 mm and 4.0 mm. The first material has a liquid permeability rate of less than approximately 0.003 mm/second with no wicking of liquid. Moreover, the openings 62 may have an area of between approximately 0.2 square mm and 1.8 square mm, such as approximately 0.8 square mm. The first material may have an opening area to surface area ratio of between approximately 0.1 and 0.8, such as approximately 0.3. Also, one embodiment of the first material may have a density that is approximately 60%-70% of the density of the second material. Also, the first material may have a higher permeability than the second material, and a higher opening area to surface area ratio than the second material.

The second portion 60 may be joined to an edge of the first portion 58 and may be configured for covering a lateral portion of the seat 10. In one embodiment, the second portion 60 is sewn to the first portion 58. However, it will be understood that other methods may be used to attach the first portion 58 and the second portion 60, such as adhesives, or the first portion 58 may be formed as a one-piece member with the second portion 60. Moreover, the second portion 60 may be formed of a suitable material, such as polyester or nylon. Alternatively, the second portion 60 may be formed of other suitable materials, such as leather, suede, alcantara, vinyl, cloth or the like. Accordingly, it will be understood that the second portion 60 may be formed of a material that is different than the material in the first portion 58. In particular, the second portion 60 may be formed of materials having different permeability characteristics. For example, the second portion 60 may be less permeable to air than the first portion 58. The second portion 60 may thus be formed of materials that may be readily commercially available to be economically produced without additional measures to reduce liquid permeability and enhance the ability to allow air to pass through the material.

In the embodiment shown, the second portion 60 is joined to a peripheral edge of the first portion 58 such that the first portion 58 is positioned in a central area of the seat cover 50, and the second portion 60 is positioned on opposing lateral sides of the first portion 58. In this arrangement, the portion of the seat cover 50 corresponding to the ventilation area 40 of the seat 10 utilizes the first material to allow ventilation and provide moisture protection to the seat 10. However, where additional ventilation capabilities are not needed, the second material in the second portion 60 may be used. Thus, the seat cover 50 may be constructed to be suitable for ventilated seats and still provide protection to the seat 10 in a cost efficient manner.

It will be appreciated that alternative embodiments of the seat cover 50 may be provided with one or more scrim layers (not shown) on one or both sides of the seat cover 50. The scrim layers may be formed of any suitable material and may be configured to enhance the appearance or function of the seat cover 50. The scrim layers may alter the liquid and air permeability characteristics of the seat cover 50 to allow for alterations of the first material in the first portion 58 of the seat cover 50.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A cover for removable attachment to a seat, the cover comprising:
    a first portion formed of a first material, the first portion configured to be placed on an area of the seat corresponding to a ventilation area of the seat;
    a second portion formed of a second material that is different from the first material, the second portion joined to an edge of the first portion and configured for covering a lateral portion of the seat;
    an attachment mechanism for removably attaching the first portion and the second portion to the seat;
    wherein the first material comprises a mesh fabric defining openings for allowing air to pass through the first material, and wherein the first material further comprises a silicone coating to create liquid surface tension and impede the flow of liquid through the first material;
    wherein the mesh fabric comprises strands that are coated with silicone such that silicone covers the strands throughout a thickness of the first material.

2. The cover of claim 1, wherein the strands comprise woven polyester strands.

3. The cover of claim 2, wherein a composition of the first material is uniform throughout a thickness of the first portion.

4. The cover of claim 1, wherein the second material comprises at least one of a polyester and a nylon material that is less permeable to air than the first material.

5. The cover of claim 1, wherein the first portion and the second portion are sewn together.

6. The cover of claim 1, wherein the first portion is positioned in a central area of the cover, and the second portion is positioned on opposing lateral sides of the first portion.

7. The cover of claim 1, wherein the first material has a thickness of between approximately 2.0 mm and 4.0 mm, and wherein the first material has a liquid permeability rate of less than 0.003 mm/second.

8. The cover of claim 1, wherein the first material has an opening area to surface area ratio of between approximately 0.1 and 0.8.

9. The cover of claim 1, wherein the openings have an area of between 0.2 square mm and 1.8 square mm.

10. The cover of claim 1, wherein the attachment mechanism for removably attaching the first portion and the second portion to the seat comprises a pocket configured to fit within a seat pocket on a back of the seat.

11. A cover for removable attachment to a seat, the cover comprising:
    a first portion formed of a first material comprising a mesh fabric defining openings for allowing air to pass through the first material, the first portion configured to be placed on an area of the seat corresponding to a ventilation area of the seat; and
    a second portion formed of a second material that is different from the first material, the second portion joined to a peripheral edge of the first portion such that the first portion is positioned in a central area of the cover, and the second portion is positioned on opposing lateral sides of the first portion;
    wherein the first material comprises woven polyester strands, and wherein an exterior of the polyester strands are coated with silicone such that silicone covers the strands throughout a thickness of the first material.

12. The cover of claim 11, wherein the second material comprises at least one of a polyester and a nylon material.

13. The cover of claim 11, further comprising an attachment mechanism for removably attaching the first portion and the second portion to the seat.

14. The cover of claim 11, wherein the first material has a thickness of between approximately 2.0 mm and 4.0 mm, and wherein the first material has a liquid permeability rate of less than 0.003 mm/second.

15. The cover of claim 11, wherein the first material has an opening area to surface area ratio of between approximately 0.1 and 0.8.

16. A cover for removable attachment to a seat, the cover comprising:
    a first portion formed of a first material comprising a mesh fabric defining openings for allowing air to pass through the first material, the first material further comprising a silicone coating to create liquid surface tension and impede the flow of liquid through the first material, the first portion configured to be placed on an area of the seat corresponding to a ventilation area of the seat; and
a second portion formed of a second material that is different from the first material, the second portion joined to a peripheral edge of the first portion such that the first portion is positioned in a central area of the cover, and the second portion is positioned on opposing lateral sides of the first portion;
wherein the first material has a liquid permeability rate of less than 0.003 mm/second and wherein the first material has a thickness of between approximately 2.0 mm and 4.0 mm.

17. The cover of claim 16, further comprising an attachment mechanism for removably attaching the first portion and the second portion to the seat.

18. The cover of claim 16, wherein the first material comprises woven polyester strands.

19. The cover of claim 16, wherein a composition of the first material is uniform throughout a thickness of the first portion.

20. The cover of claim 16, wherein the first material has an opening to surface area ratio of between approximately 0.1 and 0.8.

* * * * *